(12) United States Patent
Schnell et al.

(10) Patent No.: US 9,855,649 B2
(45) Date of Patent: Jan. 2, 2018

(54) SPINDLE LOCKING DEVICE

(71) Applicant: Robert Bosch GmbH, Stuttgart (DE)

(72) Inventors: Pascal Schnell, Baerschwil (CH);
Robert Simm, Oekingen (CH);
Thomas Bannwart, Seftigen (CH)

(73) Assignee: Robert Bosch GmbH, Stuttgart (DE)

( * ) Notice: Subject to any disclaimer, the term of this patent is extended or adjusted under 35 U.S.C. 154(b) by 459 days.

(21) Appl. No.: 14/412,279

(22) PCT Filed: May 29, 2013

(86) PCT No.: PCT/EP2013/061000
§ 371 (c)(1),
(2) Date: Dec. 31, 2014

(87) PCT Pub. No.: WO2014/005768
PCT Pub. Date: Jan. 9, 2014

(65) Prior Publication Data
US 2015/0183106 A1    Jul. 2, 2015

(30) Foreign Application Priority Data

Jul. 4, 2012 (DE) .................. 10 2012 211 628

(51) Int. Cl.
*B27C 5/10* (2006.01)
*B25F 5/00* (2006.01)
(Continued)

(52) U.S. Cl.
CPC .............. *B25F 5/001* (2013.01); *B23Q 5/043* (2013.01); *B24B 23/022* (2013.01); *B27C 5/10* (2013.01);
(Continued)

(58) Field of Classification Search
CPC ... B25F 5/00; B25F 5/001; B27C 5/10; B24B 23/02; B24B 23/022; B23B 2231/2081;
(Continued)

(56) References Cited

U.S. PATENT DOCUMENTS 2,897,302 A    7/1959   Godfrey et al.
5,191,968 A    3/1993   McCurry
(Continued)

FOREIGN PATENT DOCUMENTS

CN    1153873 A    7/1997
CN    1332050 A    1/2002
(Continued)

OTHER PUBLICATIONS

International Search Report corresponding to PCT Application No. PCT/EP2013/061000, dated Aug. 30, 2013 (German and English language document) (5 pages).

*Primary Examiner* — Scott A. Smith
(74) *Attorney, Agent, or Firm* — Maginot, Moore & Beck LLP (57) ABSTRACT

A spindle locking device for a portable machine tool includes a locking unit and a movement activation unit. The locking unit has a movably mounted locking element configured to lock a spindle of the portable machine tool in at least one direction, and an operating element configured to actuate the locking element. The movement activation unit is configured to pretension the locking element in a direction towards a locking position, at least when the operating element is in an unactuated position.

11 Claims, 4 Drawing Sheets

(51) Int. Cl.
*B24B 23/02* (2006.01)
*B23Q 5/04* (2006.01)

(52) U.S. Cl.
CPC ... *B23B 2231/2081* (2013.01); *B23B 2270/60* (2013.01)

(58) Field of Classification Search
CPC .............. B23B 2270/60; B23Q 5/043; Y10T 409/306608; Y10T 409/309352; Y10T 279/3451
USPC .... 173/48, 216, 217, 213, 29, 156; 409/182, 409/134, 231; 408/710, 239 R; 279/150
See application file for complete search history.

(56) References Cited

U.S. PATENT DOCUMENTS

| | | | | |
|---|---|---|---|---|
| 5,263,283 A | * | 11/1993 | Rudolf | B24B 45/006 451/342 |
| 5,346,342 A | * | 9/1994 | Winchester | B23Q 11/0092 144/136.95 |
| 5,590,988 A | * | 1/1997 | Rusconi | B27C 5/10 144/136.95 |
| 6,042,310 A | * | 3/2000 | Campbell | B23B 31/201 279/150 |
| 6,213,695 B1 | * | 4/2001 | Breitenmoser | B25F 5/001 173/178 |
| 6,224,304 B1 | * | 5/2001 | Smith | B23B 31/201 279/150 |
| 6,350,087 B1 | * | 2/2002 | Berry | B23B 31/001 144/154.5 |
| 6,488,451 B1 | * | 12/2002 | Hartman | B25F 5/001 408/124 |
| 6,789,630 B2 | * | 9/2004 | Quirijnen | B25F 5/001 173/114 |
| 7,344,141 B2 | * | 3/2008 | Schnell | B23B 31/201 279/150 |
| 7,980,325 B2 | * | 7/2011 | Botefuhr | B24B 23/022 173/213 |
| 8,631,733 B2 | | 1/2014 | Imamura et al. | |
| 2008/0014844 A1 | | 1/2008 | Pontieri | |
| 2011/0107892 A1 | | 5/2011 | Imamura et al. | |

FOREIGN PATENT DOCUMENTS

| | | |
|---|---|---|
| CN | 1721133 A | 1/2006 |
| CN | 1894072 A | 1/2007 |
| EP | 0 982 103 A1 | 3/2000 |

* cited by examiner

SPINDLE LOCKING DEVICE

This application is a 35 U.S.C. §371 National Stage Application of PCT/EP2013/061000, filed on May 29, 2013, which claims the benefit of priority to Serial No. DE 10 2012 211 628.1, filed on Jul. 4, 2012 in Germany, the disclosures of which are incorporated herein by reference in their entirety.

BACKGROUND

Spindle locking devices for portable machine tools, having a locking unit, which comprises a movably mounted locking element for locking a spindle in one direction and comprises an operating element for actuating the locking element, are already known.

SUMMARY

The disclosure is based on a spindle locking device for a portable machine tool, having at least one locking unit, which comprises at least one movably mounted locking element for locking a spindle in at least one direction and comprises at least one operating element for actuating the locking element.

It is proposed that the spindle locking device has at least one movement activation unit, which pretensions the locking element, at least in an unactuated position of the operating element, in the direction of a locking position of the locking element. Particularly preferably, the movement activation unit pretensions the locking element, at least in an unactuated position of the operating element, in the direction of a locking position of the locking element and, as a consequence of an actuation of the operating element, frees an automatic movement of the locking element in the direction of the locking position. By a "locking unit" should here be understood, in particular, a unit which, by means of a positive and/or non-positive connection between at least one element and a further, movably mounted element, prevents movement of the further element in at least one direction. Preferably, the locking element is configured as a positive locking unit. Thus the locking element is preferably configured as a positive locking element. However, it is also conceivable for the locking unit to have a different configuration which appears sensible to a person skilled in the art, such as, for instance, a configuration as a non-positive locking unit, etc. The locking unit is preferably provided to lock the spindle of the portable machine tool for a tool change. By "provided" should be understood, in particular, specially programmed, specially designed or specially equipped.

The term "operating element" is meant to define, in particular, an element which is provided to, in an operating process, receive an input variable from an operator and, in particular, be directly contacted by an operator, wherein a touching of the operating element is sensed, and/or an actuating force applied to the operating element is sensed, and/or is mechanically relayed for the actuation of a unit and/or of an element, in particular the stop element. The operating element can here be configured as a lever element, as a sliding element, as a pressing element, etc. The locking element is preferably moved by the operating element only into a release position of the locking element. The locking element is moved into the locking position of the locking element preferably by means of the movement activation unit.

The expression "unactuated position of the operating element" is here meant to define, in particular, a position of the operating element in which no actuating force is applied by an operator to the operating element, in particular no actuating force for moving the locking element into the locking position of the locking element. The term "locking position" is here meant to define, in particular, a position of the locking element in which the spindle is locked by the locking element against movement in at least one direction. By means of the inventive configuration of the spindle locking device, an automatic movement of the locking element, following activation of the locking unit, can advantageously be made. Thus, a spindle locking device which is comfortable to operate can advantageously be achieved.

In a preferred embodiment of the spindle locking device according to the disclosure, the movement activation unit comprises at least one spring element, which subjects the locking element to a spring force in the direction of the locking position of the locking element. By a "spring element" should be understood, in particular, a macroscopic element which has at least one extent that, in a normal operating state, is elastically variable by at least 10%, in particular by at least 20%, preferably by at least 30%, and particularly advantageously by at least 50%, and which, in particular, generates a counterforce that is dependent on a change in the extent and is preferably proportional to the change and that opposes the change. By an "extent" of an element should be understood, in particular, a maximum distance apart of two points on a perpendicular projection of the element onto a plane. By a "macroscopic element" should be understood, in particular, an element having an extent of at least 1 mm, in particular of at least 5 mm, and preferably of at least 10 mm. Particularly preferably, the spring element is configured as a helical compression spring. However, it is also conceivable for the spring element to have a different configuration which appears sensible to a person skilled in the art, such as, for instance, a configuration as a spiral tension spring, as a cup spring as a volute spring, etc. By means of the inventive configuration of the spindle locking device, a constructively simple pretensioning of the locking element into the locking position can advantageously be achieved. In addition, a cost-effective spindle locking device can advantageously be realized.

Furthermore, it is proposed that the movement activation unit comprises at least one holding element, which holds the operating element in at least an actuated position of the operating element. The expression "actuated position of the operating element" is here meant to define, in particular, a position of the operating element in which the operating element is found after an operator has influenced an actuating force in order to activate a movement option of the locking element and/or move the locking element.

Particularly preferably, the holding element is configured as a positive holding element. However, it is also conceivable for the holding element to have a different configuration which appears sensible to a person skilled in the art, such as, for instance, a configuration as a non-positive holding element, etc. It is further conceivable for the movement activation unit to have, alternatively or additionally to the holding element, at least one stop element, which limits a motional path of the operating element. The stop element could here preferably be formed onto the operating element, which, in order to limit a motional path of the operating element, interacts with a machine tool housing of the portable machine tool. By means of the inventive configuration of the spindle locking device, a high ease of use for an operator can be achieved, since the operator, for instance for a tool change when the spindle is locked or blocked due to holding of the operating element by the holding element, can use both hands for the tool change.

Particularly preferably, the operating element has at least one counter-holding element, which corresponds with a holding element of the movement activation unit and which, by means of interaction with the holding element, holds the operating element in at least an actuated position of the operating element. Preferably, the operating element has at least one counter-holding element, which is configured as a holding recess and in which the holding element of the movement activation unit, in at least one position of the operating element, engages. However, it is also conceivable for the operating element to have a latching projection, which, in at least one position of the operating element, engages in a holding element configured as a recess. Further configurations of the holding element and/or of the counter-holding element which appear sensible to a person skilled in the art are likewise conceivable. By means of the inventive configuration of the spindle locking device, the holding of the operating element in at least one position can be realized in a constructively simple manner.

It is further proposed that the movement activation unit comprises at least the holding element, which is configured as a spring-loaded latching bolt. However, it is also conceivable for the holding element to be configured as a spring-loaded ball, which, in order to hold the operating element in at least one position, engages in a recess of the operating element. Reliable holding of the operating element in at least an actuated position of the operating element can advantageously be achieved. In addition, by means of an overlatching of the latching bolt, a movement of the operating element, induced by an actuating force applied by an operator, can be made in an advantageously simple manner, at least from the actuated position of the operating element.

Moreover, it is proposed that the movement activation unit has an actuating projection, which holds the locking element at least in a release position of the locking element. The term "release position" is here meant to define, in particular, a position of the locking element in which the locking element is arranged at a distance from the spindle and, in particular, does not lock a movement option of the spindle in at least one direction. The actuating projection is preferably configured in one piece with the operating element. By "in one piece" should here be understood, in particular, integrally connected, for instance by a welding process, a bonding process, an injection molding process and/or a different process which appears sensible to the person skilled in the art, and/or advantageously formed in one piece, such as, for instance, by en bloc production and/or by production in a single-component or multicomponent injection process, and advantageously from a single blank. However, it is also conceivable for the actuating projection to be formed by a pin which is positively and/or non-positively connected to the operating element. By means of the inventive configuration, an unintended movement of the locking element into the locking position can advantageously be avoided.

Furthermore, it is proposed that the actuating projection is arranged on the operating element eccentrically to a motional axis of the operating element. Thus, a lever principle can advantageously be used to hold the locking element in the release position of the locking element.

It is further proposed that the operating element is pivotably mounted. The operating element is pivotably mounted, in particular along an angular range greater than 20°, preferably greater than 90°, and particularly preferably greater than 120°, about a motional axis of the operating element. Particularly preferably, the motional axis of the operating element here runs at least substantially parallel to a rotational axis of the spindle. Thus a compact arrangement of the operating element or of the spindle locking device in the region of the spindle can preferably be achieved.

Moreover, it is proposed that the locking element has at least one locking recess, which is provided to lock the spindle, by means of a positive connection, in at least one direction against movement. However, it is also conceivable for the locking element to have a locking projection which, for locking of the spindle, can engage in a recess disposed on the spindle. A reliable locking of the spindle in the locking position of the locking element can be achieved in a constructively simple manner.

The disclosure is further based on a portable machine tool having a spindle locking device according to the disclosure. By a "portable machine tool" should here be understood, in particular, a machine tool for machining of workpieces, which machine tool can be transported by an operator without a transport machine. The portable machine tool has, in particular, a mass which is less than 40 kg, preferably less than 10 kg, and particularly preferably less than 5 kg. Particularly preferably, the portable machine tool is configured as a router. However, it is also conceivable for the portable machine tool to have a different configuration which appears sensible to a person skilled in the art, such as, for instance, a configuration as a plunge-cut saw, etc. A comfortable tool change can advantageously be enabled, whereby a high ease of use for an operator of the portable machine tool can be achieved.

The spindle locking device according to the disclosure and/or the portable machine tool according to the disclosure should not here be limited to the above-described application and embodiment. In particular, in order to fulfill a herein described working method, the spindle locking device according to the disclosure and/or the portable machine tool according to the disclosure can have a number which varies from a herein stated number of individual elements, components and units.

BRIEF DESCRIPTION OF THE DRAWINGS

Further advantages emerge from the following description of the drawings. In the drawings, an illustrative embodiment of the disclosure is represented. The drawings, the description and the claims contain numerous features in combination. The person skilled in the art will expediently also view the features individually and combine them into sensible further combinations.

DETAILED DESCRIPTION

Figure 1:
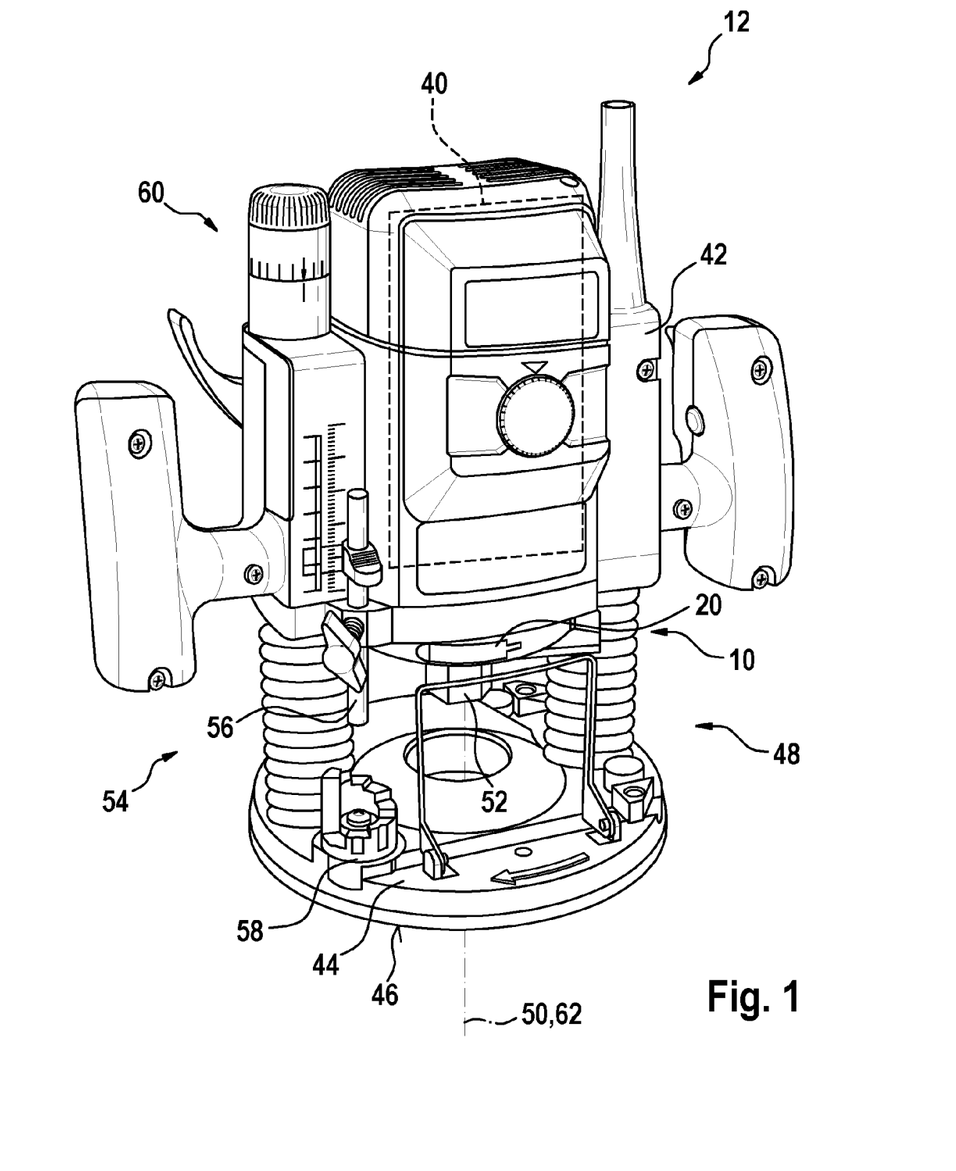
FIG. 1 shows in a schematic representation a portable machine tool according to the disclosure with a spindle locking device according to the disclosure.

FIG. 1 shows a portable machine tool 12, configured as a router, which comprises a drive unit 40 for driving an insert tool (not represented in detail here) and a machine tool housing 42 in which the drive unit 40 is disposed. The drive unit 40 is configured as an electric motor, which is provided to drive a spindle 18 of the portable machine tool 12 rotatingly about a rotational axis 62. On the spindle 18 is here arranged a tool holder 52 for receiving the insert tool in a rotationally secure manner. The tool holder 52 is configured as a collet chuck, which is provided to receive the insert tool for machining of a workpiece. The portable machine tool 12 further comprises a bearing unit 44, which has at least one bearing surface for bearing on a workpiece to be machined. Furthermore, the portable machine tool 12 comprises a guide unit 48, by means of which the machine tool housing 42 is mounted movably relative to the bearing unit 44. The machine tool housing 42 is here mounted such that it is linearly movable relative to the bearing unit 44 along a stroke axis 50 of the portable machine tool 12.

Moreover, the portable machine tool 12 comprises a milling depth coarse adjustment unit 54, which has at least one movement limiting element 56 for adjusting a length of a motional path of the machine tool housing relative to the bearing unit 44. The movement limiting element 56 is arranged such that it is displaceable at least substantially parallel to the stroke axis 50. The movement limiting element 56 is here lockable by means of a binding screw of the milling depth coarse adjustment unit 54, in a manner which is already known to a person skilled in the art. The milling depth coarse adjustment unit 54 further comprises a turret stop 58, which is rotatably disposed on a side, facing the machine tool housing 42, of the bearing unit 44 and which has in a known manner stop elements, which are provided as a stop of the movement limiting element 56 when the machine tool housing 42 is moved in the direction of the bearing unit 44. Furthermore, the portable machine tool 12 has a milling depth fine adjustment unit 60 for finely adjusting a cutting depth of the portable machine tool 12 or of the insert tool. The portable machine tool 12 configured as a router thus has at least substantially a configuration which is already known to a person skilled in the art.

Figure 2:
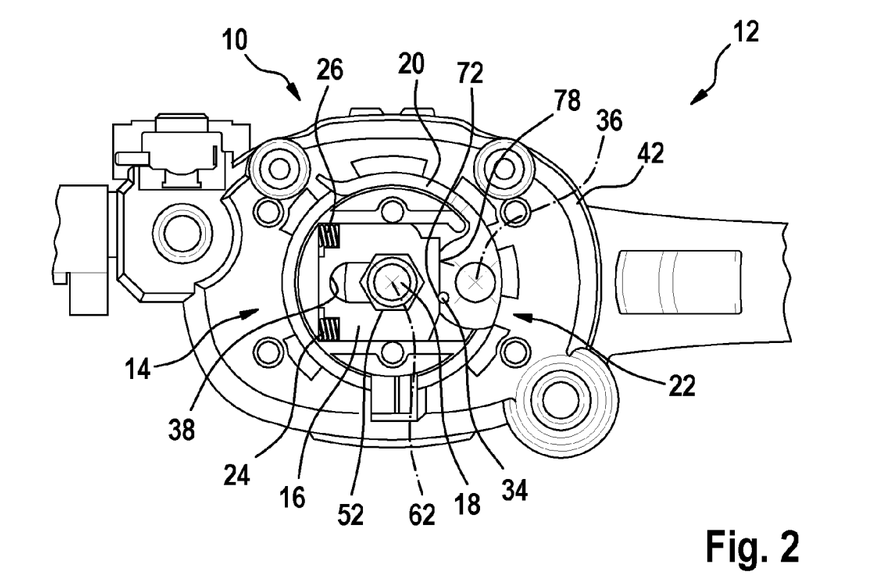
FIG. 2 shows in a schematic representation a detailed view of the spindle locking device with an operating element, found in an unactuated position, of a locking unit of the spindle locking device.
Figure 3:
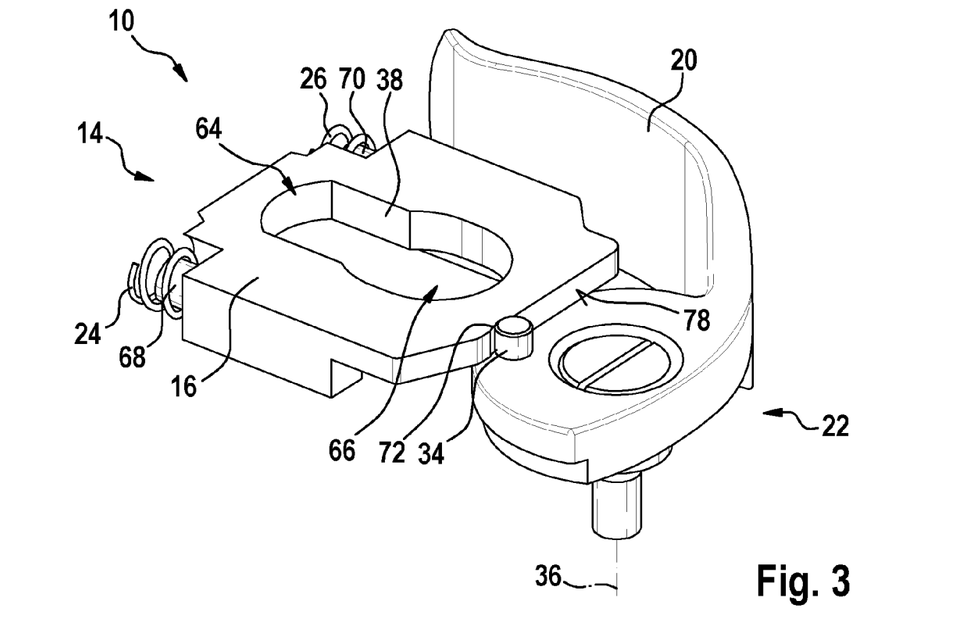
FIG. 3 shows in a schematic representation a detailed view of the spindle locking device according to the disclosure in a state removed from a machine tool housing of the portable machine tool according to the disclosure, with the operating element, found in an unactuated position.
Figure 4:
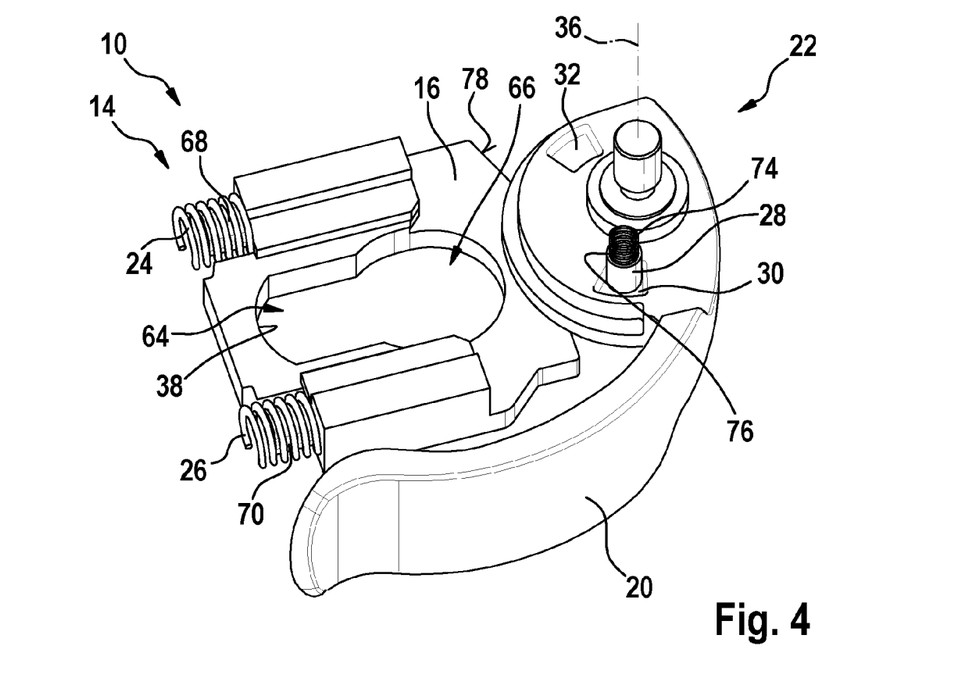
FIG. 4 shows in a schematic representation a further detailed view of the spindle locking device according to the disclosure in a state removed from the machine tool housing, with the operating element, currently in an unactuated position.

Furthermore, the portable machine tool 12 has at least one spindle locking device 10. The spindle locking device 10 is disposed on the machine tool housing 42 on a side, facing the bearing unit 44, of the machine tool housing 42 (FIG. 2). However, it is also conceivable for the spindle locking device 10 to be disposed on the machine tool housing 42 at a different position which appears sensible to a person skilled in the art, such as, for instance, on a side of the machine tool housing 42 which is facing away from the bearing unit 44. The spindle locking device 10 for the portable machine tool 12 comprises at least one locking unit 14, which has at least one movably mounted locking element 16 for locking the spindle 18 in at least one direction and which has at least one operating element 20 for actuating the locking element 16. The spindle locking device 10 further has at least one movement activation unit 22, which pretensions the locking element 16, at least in an unactuated position of the operating element 20, in the direction of a locking position of the locking element 16. To this end, the movement activation unit 22 comprises at least one spring element 24, which subjects the locking element 16 to a spring force in the direction of the locking position of the locking element 16. A longitudinal axis of the spring element 24 here runs at least substantially transversely to the rotational axis 62 of the spindle 18. The spring element 24 is supported with one end against the machine tool housing 42, while with a further end the spring element 24 is supported against the locking element 16. The locking element 16 has for guidance of the spring element 24 a guide projection 68. The spring element 24 is here arranged with the further end on the guide projection 68. However, it is also conceivable for the locking element 16 to be configured decoupled from the guide projection 68 and for the spring element 24 to be supported directly against an outer face of the locking element 16. In a release position of the locking element 16, the spring element 24 is compressed for pretensioning of the locking element 16 in the direction of the locking position of the locking element 16 (FIGS. 2 to 4).

The movement activation unit 22 further has at least one further spring element 26, which subjects the locking element 16 to a spring force in the direction of the locking position of the locking element 16. A longitudinal axis of the further spring element 26 runs at least substantially transversely to the rotational axis 62 of the spindle 18. The longitudinal axis of the spring element 24 and the longitudinal axis of the further spring element 26 run at least substantially in parallel. The further spring element 26 is supported with one end against the machine tool housing 42, while with a further end the further spring element 26 is supported against the locking element 16. The locking element 16 has for guidance of the further spring element 26 a further guide projection 70. The further spring element 26 is here disposed with the further end on the further guide projection 70. In a release position of the locking element 16, the further spring element 26 is compressed for pretensioning of the locking element 16 in the direction of the locking position of the locking element 16 (FIGS. 2 to 4).

Figure 5:
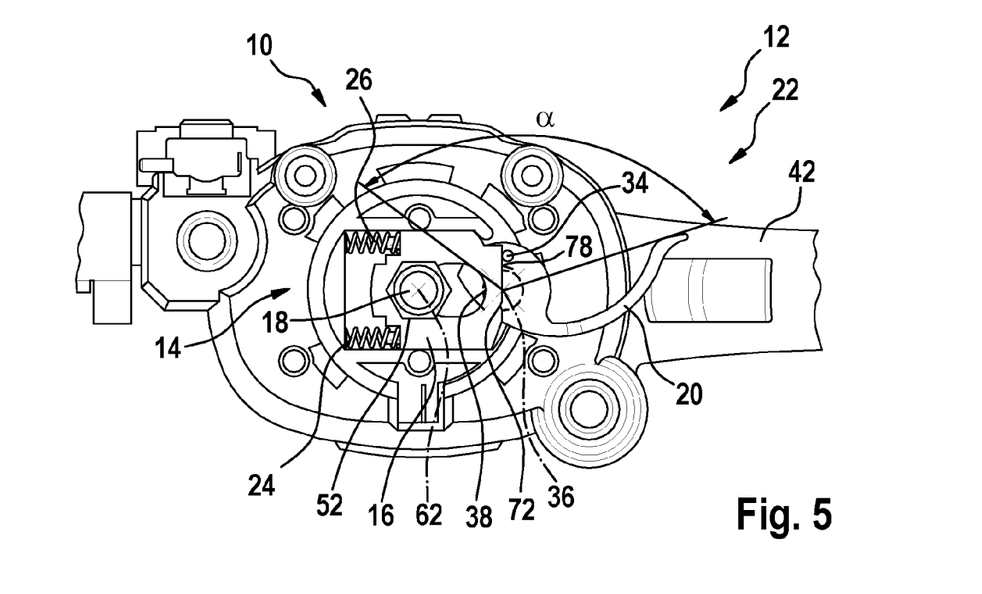
FIG. 5 shows in a schematic representation a detailed view of the spindle locking device according to the disclosure, with the operating element, currently found in an actuated position.
Figure 6:
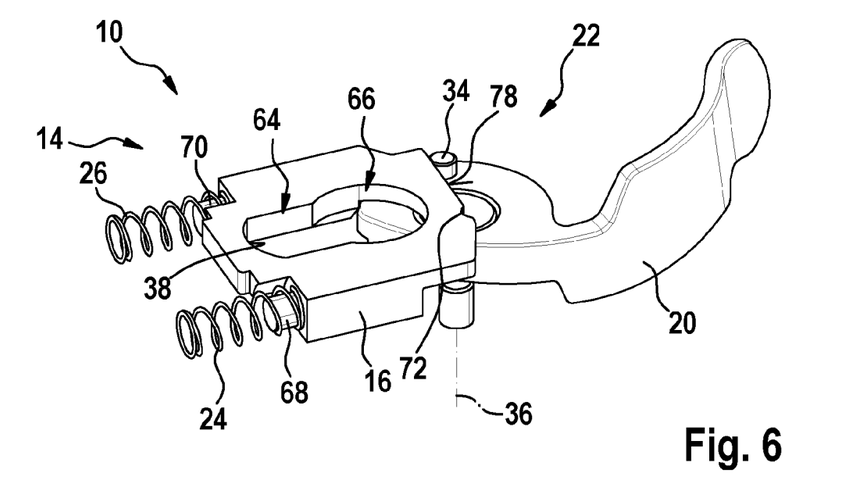
FIG. 6 shows in a schematic representation a detailed view of the spindle locking device according to the disclosure in a state removed from the machine tool housing of the portable machine tool according to the disclosure, with the operating element, currently found in an actuated position.

In the locking position, the locking element 16 locks the spindle 18, by means of a positive connection, against a rotary movement about the rotational axis 62 of the spindle 18 (FIG. 5). To this end, the locking element 16 has at least one locking recess 38, which is provided to lock the spindle 18, by means of a positive connection, in at least one direction against movement. The locking recess 38 here has a locking region 64, which has a configuration corresponding to an external shape of the spindle 18 (FIGS. 3, 4, 6, and 7). The locking element 16 here has at least two at least substantially parallelly and rectilinearly running locking boundary regions, which limit the locking region 64 of the locking recess 38. The two at least substantially parallelly and rectilinearly running locking boundary regions interact positively, for locking of the spindle 18, with two at least substantially parallelly and rectilinearly running locking faces of the spindle 18. The locking recess 38 further has a release region 66, which, in comparison to the locking region 64, has a larger internal dimension than an internal dimension of the locking region 64 (FIGS. 3, 4, 6 and 7). The release region 66 of the locking recess 38 has a circular-segment-like configuration, which enables a free rotary movement of the spindle 18 about the rotational axis 62 of the spindle 18 within the release region 66 of the locking recess 38. To this end, the release region 66 of the locking recess 38 has, in comparison to the spindle 18, a larger internal dimension than an external dimension of the spindle 18. The locking region 64 and the release region 66 of the locking recess 38 are arranged directly adjacent to each other on the locking element 16.

The movement activation unit 22 has an actuating projection 34, which holds the locking element 16 at least in the release position of the locking element 16. The actuating projection 34 is here provided to hold the locking element 16 in the release position of the locking element 16, against the action of spring forces of the spring element 24 and of the further spring element 26. In order to hold the locking element 16 in the release position of the locking element 16, the actuating projection 34 interacts with a control recess 72 of the locking element 16. Here, in the release position of the locking element 16, the actuating projection 34 engages in the control recess of the locking element 16. However, it is also conceivable for the locking element 16 to be configured decoupled from the control recess 72, and for the actuating projection 34, in at least one state, to bear directly against an outer face 78 of the locking element 16. The actuating projection 34 is arranged on the operating element 20 eccentrically to a motional axis 36 of the operating element 20. The actuating projection 34 is here configured in one piece with the operating element 20. The operating element 20 is mounted pivotably about the motional axis 36 of the operating element 20. The operating element 20 is here configured as an operating lever, which is pivotably mounted on the machine tool housing 42. The motional axis 36 of the operating element 20 runs at least substantially parallel to the rotational axis 62 of the spindle 18. The operating element 20 is mounted on the machine tool housing 42 such that it is pivotable relative to the machine tool housing 42, about the motional axis 36 of the operating element 20, along an angular range a which is greater than 120° (FIG. 5). However, it is also conceivable for the operating element 20 to be mounted on the machine tool housing 42 such that it is pivotable relative to the machine tool housing 42, about the motional axis 36 of the operating element 20, along an angular range a which is different from 120°, or along an angular range a which is equal to 120°.

Figure 7:
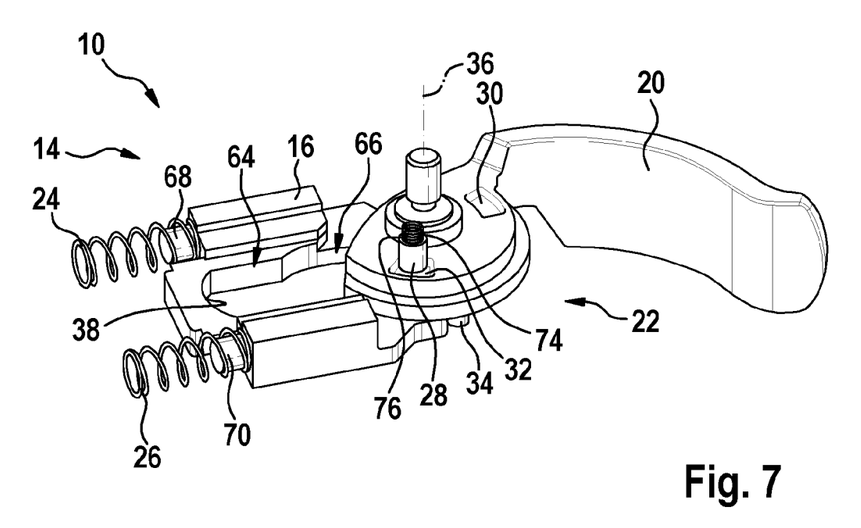
FIG. 7 shows in a schematic representation a further detailed view of the spindle locking device according to the disclosure in a state removed from the machine tool housing of the portable machine tool according to the disclosure, with the operating element, currently found in an actuated position.

Furthermore, the movement activation unit 22 comprises at least one holding element 28, which holds the operating element 20 in at least an actuated position of the operating element 20. The holding element 28 is configured as a spring-loaded latching bolt. Thus the movement activation unit 22 comprises at least the holding element 28, which is configured as a spring-loaded latching bolt. In order to subject the holding element 28 to a force in the direction of the operating element 20, the movement activation unit 22 comprises at least one latching bolt spring element 74 (FIGS. 4 and 7). The latching bolt spring element 74 is configured as a helical compression spring. A longitudinal axis of the latching bolt spring element runs at least substantially parallel to the rotational axis 62 of the spindle 18. In order to apply a force to the holding element 28, the latching bolt spring element 74 is supported with one end against the machine tool housing 42, while with a further end the latching bolt spring element 74 is supported against the holding element 28. For reception of the latching bolt spring element 74, the holding element 28 has a spring seat 76, in which the latching bolt spring element 74 is at least partially disposed.

The operating element 20 has at least one counter-holding element 30, which corresponds with a holding element 28 of the movement activation unit 22 and which, by means of interaction with the holding element 28, holds the operating element 20 in at least an actuated position of the operating element 20. In the actuated position of the operating element 20, or after the operating element 20 has been pivoted relative to the machine tool housing 42, about the motional axis 36 of the operating element 20, along the angular range a of more than 120°, a latching head of the holding element 28 configured as a latching bolt here engages in the counter-holding element 30 configured as a receiving recess. The operating element 20 is hereby held by means of a positive connection in the actuated position. In the actuated position of the operating element 20, the locking element 16 is movable in dependence on an orientation of the spindle 18 relative to the locking region 64 of the locking recess 38, and due to spring forces of the spring element 24 and of the further spring element 26, into the locking position of the locking element 16.

The operating element 20 further comprises at least one further counter-holding element 32, which corresponds with a holding element 28 of the movement activation unit 22 and which, by means of interaction with the holding element 28, holds the operating element 20 in at least an unactuated position of the operating element 20. The latching head of the holding element 28 configured as a latching bolt, in the unactuated position of the operating element 20, here engages in the further counter-holding element 32 configured as a receiving recess. The operating element 20 is hereby held, by means of a positive connection, in the unactuated position. In the unactuated position of the operating element 20, the locking element 16 is prevented by the actuating projection 34 formed in one piece onto the operating element 20 from moving, due to spring forces of the spring element 24 and of the further spring element 26, into the locking position of the locking element 16. The counter-holding element 30 and the further counter-holding element 32 are disposed on the operating element 20 at a distance apart along a peripheral direction running around the motional axis 36 of the operating element 20 (FIGS. 4 and 7).

For locking of the spindle 18 against a rotary movement of the spindle 18 about the rotational axis 62 of the spindle 18, an operator actuates the operating element 20. The operator here pivots the operating element 20, starting from the unactuated position of the operating element 20 about the motional axis 36 of the operating element 20 into the actuated position of the operating element 20. Due to a pivot movement of the operating element 20 about the motional axis 36 of the operating element 20, the actuating projection 34 slides out of the control recess 72 of the locking element 16 and on the outer face 78 of the locking element 16. A mobility of the locking element 16 in the direction of the locking position of the locking element 16 or in the direction of the spindle 18, due to spring forces of the spring element 24 and of the further spring element 26, is hereby released. The outer face 78 is here disposed on the locking element 16 on a side of the locking element 16 which is facing away from the guide projection 68 and from the further guide projection 70. Moreover, the outer face 78 is arranged directly adjacent to the control recess 72 on the locking element 16.

The operating element 20 is held, by means of interaction of the holding element 28 and of the counter-holding element 30, in the actuated position of the operating element 20. As soon as the locking faces of the spindle 18 are aligned with the two at least substantially parallelly and rectilinearly running locking boundary regions of the locking element 16, the locking element 16 is moved by means of spring forces of the spring element 24 and of the further spring element 26, starting from the release position of the locking element 16, into the locking position of the locking element 16. Thus, once the locking position of the locking element 16 is reached, the spindle 18 is locked, by means of a positive connection of the locking element 16 and of the spindle 18, against rotary movement about the rotational axis 62 of the spindle 18.

In order to lift a locking of the spindle 18, the operating element 20, starting from the actuated position, is pivoted into the unactuated position of the operating element 20. The actuating projection 34 here slides on the outer face of the locking element 16 into the control recess 72 of the locking element 16. The locking element 16, starting from the locking position of the locking element 16, is hereby moved counter to spring forces of the spring element 24 and of the further spring element 26 into the release position of the locking element 16. Moreover, due to the pivot movement of the operating element 20, the holding element 28 latches into the further counter-holding element 32. The operating element 20 is hereby held, by means of interaction of the holding element 28 and of the further counter-holding element 32, in the unactuated position of the operating element 20. Thus the actuating projection 34 forms a control cam of the movement activation unit 22. In addition, the locking element 16, in the release position of the locking element 16, is secured by the actuating projection 34 against movement in the direction of the locking position of the locking element 16 until a renewed pivot movement of the operating element 20 is made in the direction of the actuated position of the operating element 20.

The invention claimed is:

1. A spindle locking device for a portable machine tool, comprising:
   a locking unit including a movably mounted locking element configured to lock a spindle of the portable machine tool in at least one direction, and an operating element configured to actuate the locking element; and
   a movement activation unit configured to pretension the locking element in a direction towards a locking position, at least when the operating element is in an unactuated position,
   wherein the locking element is configured such that the locking element can only be moved into a released position by a pivoting movement of the operating element relative to the locking element about a motional axis of the operating element in which the operating element pivots from the unactuated position to an actuated position.

2. The spindle locking device as claimed in claim 1, wherein the movement activation unit includes a spring element configured to subject the locking element to a spring force in the direction towards the locking position.

3. The spindle locking device as claimed in claim 1, wherein the movement activation unit includes a holding element configured to hold the operating element in an actuated position.

4. The spindle locking device as claimed in claim 3, wherein:
   the operating element includes a counter-holding element which corresponds with the holding element; and
   the counter-holding element is configured to interact with the holding element to hold the operating element in an actuated position.

5. The spindle locking device as claimed in claim 1, wherein the movement activation unit includes a holding element configured as a spring-loaded latching bolt.

6. The spindle locking device as claimed in claim 1, wherein the movement activation unit includes an actuating projection configured to hold the locking element in a release position.

7. The spindle locking device as claimed in claim 6, wherein the actuating projection is positioned on the operating element eccentrically with respect to a motional axis of the operating element.

8. The spindle locking device as claimed in claim 1, wherein the operating element is configured to be pivotably mounted to the portable machine tool.

9. The spindle locking device as claimed in claim 1, wherein the locking element includes a locking recess configured to lock the spindle via a positive connection in order to prevent movement in at least one direction.

10. The spindle locking device as claimed in claim 1, wherein the operating element is configured as a cam such that pivoting the operating element from the unactuated position to the actuated position urges the locking element against the pretension of the movement activation unit along a linear path from the locking position to the released position.

11. A portable machine tool comprising:
   a spindle locking device, including:
      a locking unit having a movably mounted locking element configured to lock a spindle of the portable machine tool in at least one direction, and an operating element configured to actuate the locking element; and
      a movement activation unit configured to pretension the locking element in a direction towards a locking position, at least when the operating element is in an unactuated position,
   wherein the locking element is configured such that the locking element can only be moved into a released position by a pivoting movement of the operating element relative to the locking element about a motional axis of the operating element in which the operating element pivots from an unactuated position to an actuated position.

* * * * *